United States Patent [19]

Stockman

[11] Patent Number: 5,313,360
[45] Date of Patent: May 17, 1994

[54] DUAL CAPACITOR

[75] Inventor: Robert M. Stockman, St. Augustine, Fla.

[73] Assignee: American Radionic Co., Inc., Palm Coast, Fla.

[21] Appl. No.: 84,355

[22] Filed: Jun. 28, 1993

[51] Int. Cl.$^5$ .............................................. H01G 4/38
[52] U.S. Cl. ................... 361/328; 361/301.5; 29/25.42
[58] Field of Search ............... 361/301.5, 303, 328, 361/329, 330, 323, 324; 29/25.42

[56] References Cited

U.S. PATENT DOCUMENTS

| | | | | |
|---|---|---|---|---|
| 3,892,023 | 7/1975 | Warmont | | 361/328 |
| 3,921,041 | 11/1975 | Stockman | | 361/328 |
| 4,028,595 | 6/1977 | Stockman | | 361/328 |
| 4,263,638 | 4/1981 | Stockman | | 361/328 |
| 4,352,145 | 9/1982 | Stockman | | 361/329 |

Primary Examiner—Bruce A. Reynolds
Assistant Examiner—Michael D. Switzer
Attorney, Agent, or Firm—Parmelee, Bollinger & Bramblett

[57] ABSTRACT

A dual metallized film capacitor is provided which has improved life test characteristics in that the smaller capacitor more closely tracks the capacitance loss of the larger capacitor. This results from a reduced length of insertion of the barrier strip into the capacitor section. The result of a barrier strip of reduced width permits use of a more expensive barrier material with superior performance but without substantially increased material cost.

4 Claims, 2 Drawing Sheets

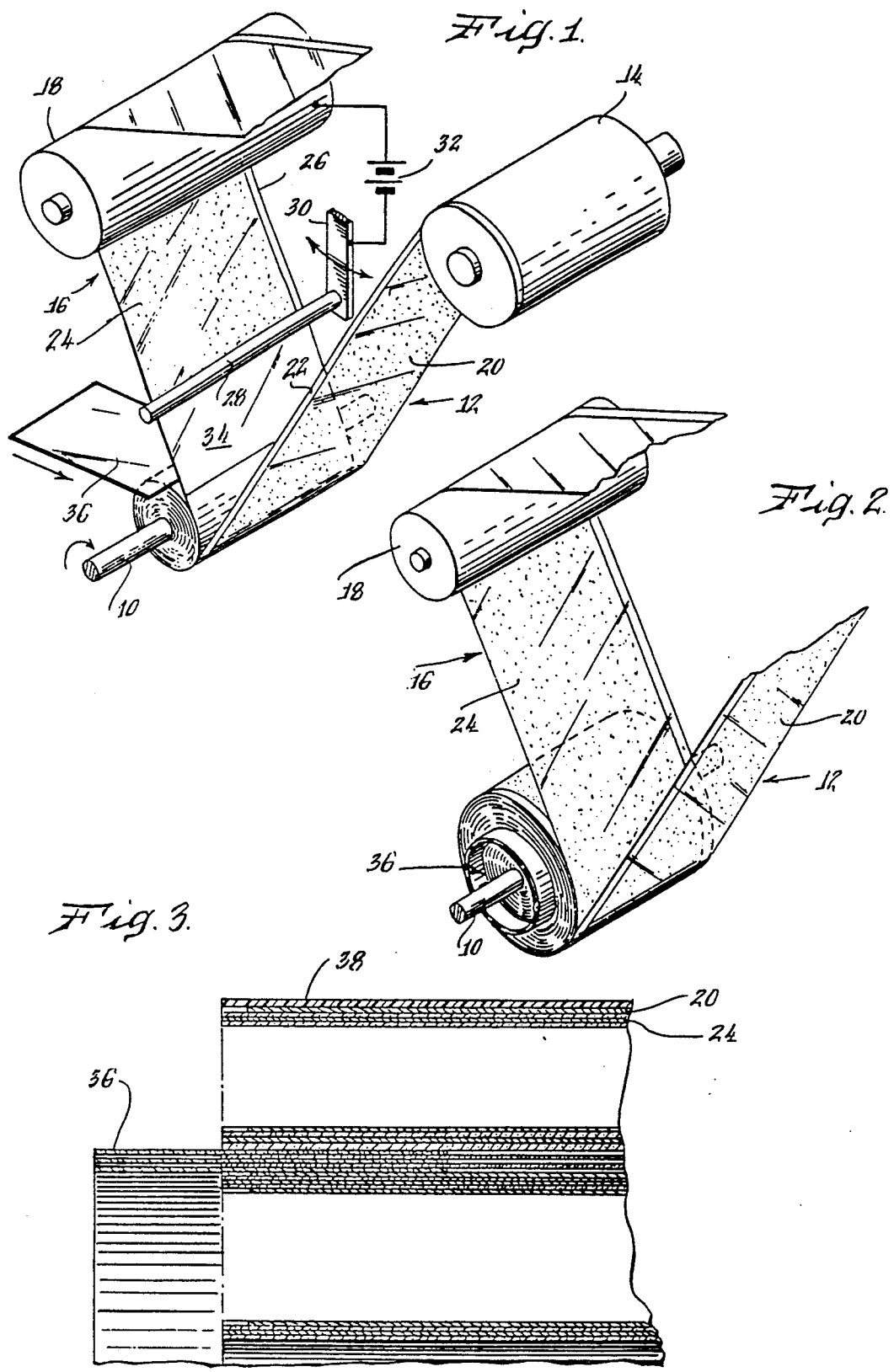

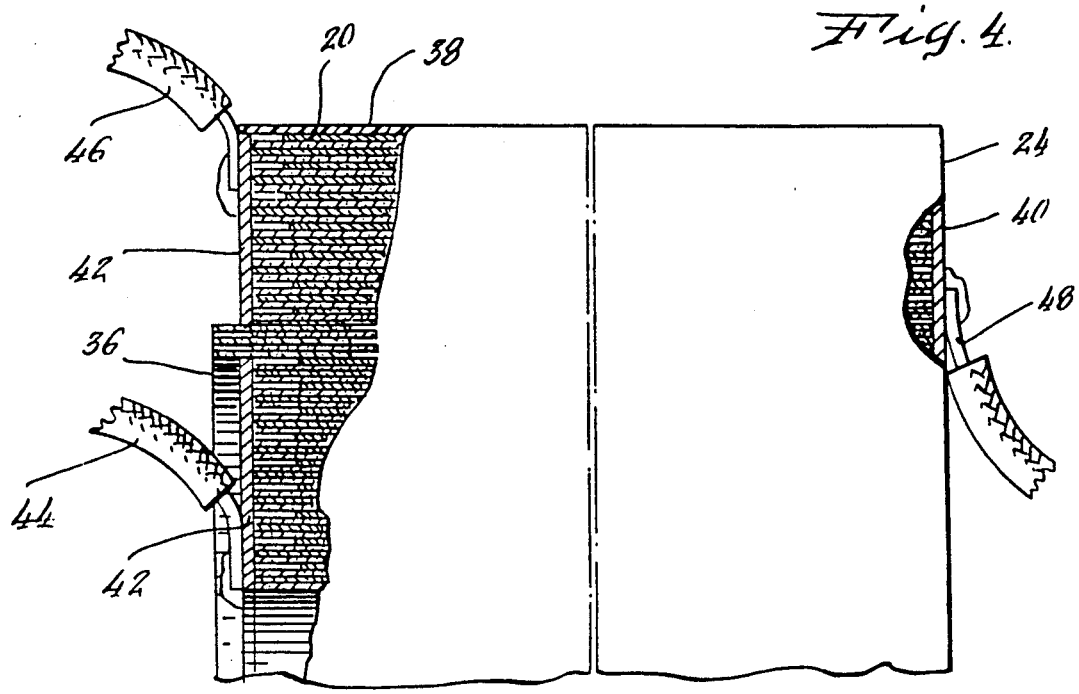
Fig. 4.
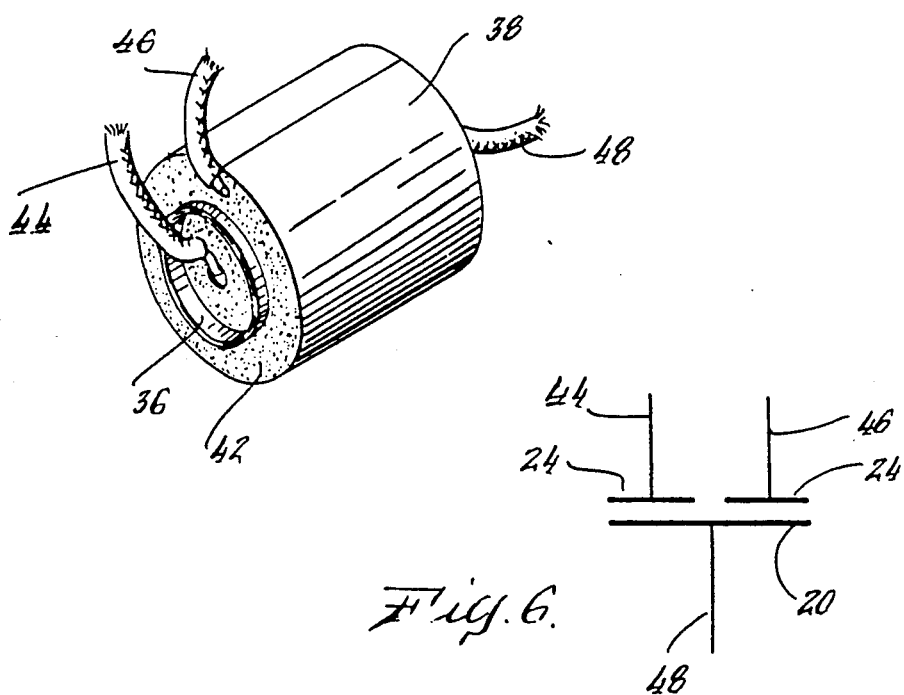
Fig. 5.
Fig. 6.

DUAL CAPACITOR

BACKGROUND OF THE INVENTION

This invention pertains to wound capacitors and, more particularly, to such capacitors of the metallized film type. The particular problem to which this invention is directed is to produce a pair of capacitors having one plate in common which have improved performance and are easier to manufacture.

My U.S. Pat. No. 3,921,041 discloses and claims a dual capacitor and method of making it. Dual capacitors made in accordance with that invention have been very successful. However, it would be desirable to improve them in at least two respects.

First, it would be desirable to improve their "life test" performance. During a life test the capacitors are subjected to extremes of temperature and voltage. For example, a 370 volt AC rated capacitor will be tested at 480 volts AC in an oven at 80° C. If the capacitors are basically "good", the standard measure of performance is the change in capacitance value ($\Delta C$) after a test of 500 to possibly as much as 2000 hours duration. Usually, the test parameter allows for a loss of 3% from the initial value. In testing dual capacitors made in accordance with the above-referenced patent having small and large capacitance values, it has been found that the smaller capacitor suffers a greater negative loss (as much as $-3\%$) whereas the larger may only lose 1%. One objective of this invention is to produce a dual capacitor which exhibits performance characteristics which more closely resemble a single capacitor.

As taught by the above-referenced patent, a barrier material is inserted into the cylindrical body to electrically separate the non-common plates of the two capacitors. The end of the body is then coated by an electric arc metal spraying technique. The metal spray is then removed from the barrier to prevent electrical "bridging." Thereafter, electrical leads are soldered to the end, one within and one without the barrier. It would be desirable to employ polycarbonate film for the barrier, rather than the polypropylene which is usually used. One reason is that polycarbonate has a "slicker" surface and the metal is more easily removed. Another reason is that, as larger capacitors are manufactured, larger electrical lead tabs must be soldered in place. The heat tends to penetrate the polypropylene barrier. The practical difficulty, however, is that the cost of polycarbonate is approximately ten times that of polypropylene. Accordingly, a second objective of this invention is to enable the use of polycarbonate without substantially increasing the cost of the dual capacitor.

The manner in which these objectives are achieved will be apparent from the following description and appended claims.

SUMMARY OF THE INVENTION

The method of making a dual metallized film capacitor which comprises providing a supply of a first dielectric film, metallized on one side, and a supply of a second dielectric film metallized on one side. The first and second films are wound in substantially cylindrical form with the nonmetallized side of each film in contact with the metallized side of the other film. The metallized edge of the first film is exposed at one end of the cylindrical form, and the metallized edge of the second film is exposed at the opposite end of the cylindrical form. The metallized layer is removed from the first film over a region intermediate its ends. A strip of insulating material is inserted between such region and the second film and is positioned to extend outwardly from one end of the cylindrical form and only a short distance into the form. The strip has a length sufficient to encircle the circumference of the form at least once. Winding is then continued for a predetermined length of film and terminated. Each end of the capacitor section so formed is then coated with metal. A first electrical lead is then connected to the wound section within the encircling strip and a second electrical lead is connected outside of such circling strip.

BRIEF DESCRIPTION OF THE DRAWINGS

FIG. 1 is a perspective view of the capacitor section in accordance with this invention in the process of being wound;

FIG. 2 is a perspective view, similar to that of FIG. 1, illustrating a further step in the winding of the capacitor section;

FIG. 3 is a partial cross-section taken through the capacitor section upon the completion of winding;

FIG. 4 is a completed capacitor constructed in accordance with this invention in partial cross-section;

FIG. 5 is a perspective view of a completed capacitor in accordance with this invention; and FIG. 6 is an electrical schematic of the capacitor of FIG. 5.

DESCRIPTION OF THE PREFERRED EMBODIMENT

This invention constitutes an improvement over that disclosed and claimed in my U.S. Pat. No. 3,921,041 of Nov. 18, 1975. As illustrated in FIG. 1 a capacitor section in accordance with this invention is being wound on a conventional winding machine having a rotating spindle 10. A metallized dielectric film 12 is fed from a first supply roll 14, and a second metallized dielectric film 16 is fed from a second supply roll (not shown). Film 16 passes over a cylindrical copper electrode 18. The film 12 carries on its near surface, as viewed in FIG. 1, a thin metallic layer 20 which extends to the right edge of the film but terminates short of the left edge leaving a non-metallized strip 22 therealong. The film 16 similarly carries a thin metal layer 24 on its near surface as viewed in FIG. 1 which extends from the left edge of the film and terminates short of the right edge to form a non-metallic strip 26 therealong. A second electrode 28 is mounted on a movable arm 30 in such a manner as to be selectively advanced against, and withdrawn from, the metallized layer 24 of the film 16. An electrical power source 32 electrically interconnects the electrodes 18, 28. The voltage employed is not critical but, in one illustrative embodiment, is 40 volts D.C.

It is an object of this invention to produce a capacitor of the type illustrated schematically in FIG. 6. As will be apparent therefrom, this comprises in essence a pair of capacitors sharing a single plate. To achieve this objective, the two films are wound on the spindle 10 in the conventional manner for a preselected number of revolutions. The number of revolutions depends upon the capacitance desired. If it is assumed that the capacitances of the dual capacitors are to be equal, one-half of the total length of the film to be employed is so wound. At this point the winding machine is stopped and the electrode 28, hitherto retracted from the film surface, is advanced against metal layer 24 of film 16 and voltage applied. The winding process is then continued at a slower speed and the resultant arcing vaporizes the metallic layer, leaving a non-metallized intermediate region 34. The length of the non-metallized region 34 is sufficient to encircle the capacitor section at least once. The electrode 28 is thereafter removed from the surface of film 16. During this interval of winding the region 34 around the capacitor section, there is inserted into the section a non-conductive strip 36 of a material, such as a plastic and, preferably, polycarbonate. The strip 36 is not centered along the length of the cylindrical section but is at one end and extends only a short distance into the section. Accordingly, as shown in FIG. 2, upon continued winding it forms a circular barrier which extends outwardly from that end of the capacitor section having the metallized edge of film 16. Winding is continued and terminated in the usual manner with the films 12, 16 being cut and the completed section being wrapped by a suitable tape 38.

The capacitor section, which is in the condition illustrated in FIG. 3, is metal plated in the conventional manner employed for attaching leads, i.e. the ends are sprayed with molten zinc. Capacitor leads are then soldered to the zinc end spray. In the case of large capacitors, metal tabs on the order of 0.25 inch in width may be soldered into place for later attachment to lead wires. In the case of smaller capacitors, the lead wires may be soldered directly to the end spray. Thereafter, the barrier formed by strip 36 is trimmed as shown in FIG. 4. The completed section, as shown in FIGS. 4 and 5 includes on one end a zinc-solder layer 40 which electrically engages the metallized layer 20 of film 12. The opposite end of the section includes a similar layer 42 which, however, is interrupted by the barrier formed by strip 36 so that the inner layer engages that portion of metallized layer 24 of film 16 which preceded the formation of region 34 while the outer portion engages the metallized layer 24 which succeeded the formation of the region 34. Thereafter, conductors 44, 46 (or metal tabs, as explained above) may be soldered to these regions as indicated. A conductor 48 may be similarly soldered to the opposite end if desired for the particular application.

It has been discovered that, by reducing the extent of insertion of the strip 36 into the capacitor section, the capacitance loss of the smaller value capacitor during a life test "tracks", or approximates that of the larger value capacitor much more closely than did prior art dual capacitors. This value may be on the order of −1%, for example. The amount of insertion is partially determined by the physical handling constraints during manufacture. At this time, it appears that an insertion of approximately 0.5 inch is required. In a capacitor section manufactured of 37.5 mm film, this is an insertion of 34% of the section length. In a section manufactured of 75 mm film, the insertion is 17%. In a section manufactured of 125 mm film, the insertion is approximately 10%. Accordingly, it appears that desirable results are obtained with insertion distances of up to approximately 35%. Furthermore, these results are achieved at the same time that easier manufacturing is obtained due to the use of polycarbonate film. Finally, cost savings are achieved because much less of the expensive polycarbonate film is required than would be needed using prior art techniques. Even with a less expensive film such as polypropylene, since the total amount needed is greatly reduced, substantial savings are realized. Additionally, the need for mating a "barrier" width to a particular metallized dielectric film width is eliminated. Thereby, eight or ten barrier films can be replaced by one single width. This provides another tremendous reduction in inventory levels with concurrent cost savings.

It is believed that the many advantages of this invention will now be apparent to those skilled in the art. It will also be apparent that a number of variations and modifications may be made in this invention without departing from its spirit and scope. Accordingly, the foregoing description is to be construed as illustrative only, rather than limiting. This invention is limited only by the scope of the following claims.

I claim:

1. A dual capacitor having improved life test capacitance loss characteristics which comprises:
    a capacitor section wound from first and second lengths of metallized dielectric film to form respective first and second layers of metal separated by dielectric film, the metallized first layer extending to the first end of said section and the metallized second layer extending to the second end of said section, a portion of the metallized first layer being removed at a region intermediate the ends of said first length for a distance sufficient to encircle said section at least once;
    a non-conductive strip inserted between said lengths, extending outwardly from the first end of said section adjacent said region to form a circular barrier separating the metallized portions of said first length, and extending into said section a distance no greater than approximately 35% of said section length;
    means for making electrical contact with said first metallic layer within said barrier;
    means for making electrical contact with said first metallic layer without said barrier; and
    means for making electrical contact with said second metallic layer.

2. The capacitor of claim 1 wherein said strip extends into said section a distance at least approximately 10% of said section length.

3. The capacitor of claim 1 wherein said strip is polycarbonate film.

4. The capacitor of claim 2 wherein said strip is polycarbonate film.

* * * * *